United States Patent
Sivakumar et al.

(10) Patent No.: US 12,505,144 B2
(45) Date of Patent: Dec. 23, 2025

(54) CACHING OF TEXT ANALYTICS BASED ON TOPIC DEMAND AND MEMORY CONSTRAINTS

(71) Applicant: International Business Machines Corporation, Armonk, NY (US)

(72) Inventors: Gandhi Sivakumar, Bentleigh (AU); Smitkumar Narotambhai Marvaniya, Bangalore (IN); Vijay Ekambaram, Chennai (IN); Luke Peter Macura, Lucas (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 17/949,575

(22) Filed: Sep. 21, 2022

(65) Prior Publication Data

US 2024/0095270 A1    Mar. 21, 2024

(51) Int. Cl.
*G06F 16/00* (2019.01)
*G06F 16/31* (2019.01)
(Continued)

(52) U.S. Cl.
CPC .......... *G06F 16/355* (2019.01); *G06F 16/322* (2019.01); *G06F 16/3329* (2019.01); *G06F 40/30* (2020.01)

(58) Field of Classification Search
CPC .. G06F 16/355; G06F 16/322; G06F 16/3329; G06F 40/30; G06F 16/243; G06F 16/24552
See application file for complete search history.

(56) References Cited

U.S. PATENT DOCUMENTS 6,681,298 B1 *   1/2004   Tso ..................... G06F 16/9574
                                              711/134
8,972,404 B1     3/2015   Lewis et al.
(Continued)

FOREIGN PATENT DOCUMENTS

GB          2637865 A      8/2025
WO       2024/060812 A1    3/2024

OTHER PUBLICATIONS

Ip.com, Method for Concept Expansion in a Multi-Tenant NLP Service, Dec. 30, 2021.
(Continued)

*Primary Examiner* — Paul Kim
(74) *Attorney, Agent, or Firm* — Garg Law Firm, PLLC; Rakesh Garg; Kristofer Haggerty

(57) ABSTRACT

An embodiment includes analyzing text content of a user query to identify via natural language processing (NLP) a query topic. The embodiment maps the query topic to a topic cluster at a node of a hierarchical model of a text database. The embodiment generates query demand data indicative of demand for the topic cluster based on user queries. The embodiment identifies the topic cluster as a topic-cache candidate based on the query demand data. The embodiment compares an amount of memory required for storing text associated with the first topic cluster to available cache memory. The embodiment caches the text of the topic cluster candidate upon determining that there is sufficient available cache memory space.

18 Claims, 11 Drawing Sheets

(51) Int. Cl.
  *G06F 16/3329* (2025.01)
  *G06F 16/355* (2025.01)
  *G06F 40/30* (2020.01)

(56) References Cited

U.S. PATENT DOCUMENTS

| | | |
|---|---|---|
| 10,409,911 B2 | 9/2019 | Goyal et al. |
| 2014/0101298 A1* | 4/2014 | Shukla ................ H04L 41/5006 709/223 |
| 2014/0377735 A1 | 12/2014 | Byron et al. |
| 2017/0132141 A1 | 5/2017 | Allen et al. |
| 2017/0270425 A1 | 9/2017 | Danson et al. |
| 2018/0081861 A1 | 3/2018 | Danielyan |
| 2018/0181549 A1 | 6/2018 | Hileman et al. |
| 2019/0005138 A1 | 1/2019 | Andreica et al. |
| 2019/0065500 A1 | 2/2019 | Martin et al. |
| 2019/0347266 A1 | 11/2019 | York et al. |
| 2020/0074321 A1 | 3/2020 | Chungapalli et al. |
| 2020/0226213 A1 | 7/2020 | Freed et al. |
| 2020/0356578 A1 | 11/2020 | Frieder et al. |
| 2021/0103608 A1 | 4/2021 | Ganti et al. |
| 2021/0209107 A1 | 7/2021 | Arocena et al. |
| 2023/0376518 A1* | 11/2023 | Ganti .................... G06F 40/284 |
| 2023/0394040 A1* | 12/2023 | Gupta ............... G06F 16/90324 |

OTHER PUBLICATIONS

Lee et al., TaxoCom: Topic Taxonomy Completion with Hierarchical Discovery of Novel Topic Clusters, Jan. 19, 2022.
Wu, Dependency Parsing with Transformed Feature, Information, Jan. 21, 2017.
Tratz et al., A Fast, Accurate, Non-Projective, Semantically-Enriched Parser, Proceedings of the 2011 Conference on Empirical Methods in Natural Language Processing, pp. 1257-1268, Jul. 27-31, 2011.
Weichselbraun et al., Optimizing Dependency Parsing Throughput, International Joint Conference on Knowledge Discovery, Knowledge Engineering and Knowledge Management (IC3K), 2015.
Liu et al., Processing-in-Memory for Energy-efficient Neural Network Training: A Heterogeneous Approach, ACM International Symposium on Microarchitecture (MICRO), 2018.
International Searching Authority, PCT/CN2023/108093, Sep. 22, 2023.

* cited by examiner

CACHING OF TEXT ANALYTICS BASED ON TOPIC DEMAND AND MEMORY CONSTRAINTS

BACKGROUND

The present invention relates generally to a method, system, and computer program product for data processing. More particularly, the present invention relates to a method, system, and computer program for caching of text analytics based on topic demand and memory constraints.

An information retrieval system is an artificial intelligence (AI) application that attempts to find relevant information by analyzing the text of a collection of documents in order to generate a response to a user's query. Examples of such systems include AI personal assistants and AI question-and-answer systems. The documents may include documents of any type, but typically will be domain-specific documents that contain information likely to be relevant for its particular application. The documents are typically stored in a text database, which is a general term used herein to refer to any digitally stored text dataset, which may be referred to elsewhere as a corpus or knowledgebase, and represents a collection of texts (or text data).

SUMMARY

The illustrative embodiments provide for caching of text analytics based on topic demand and memory constraints. An embodiment includes analyzing text content of a first user query to identify via natural language processing a first query topic defined by words of the text content. The embodiment also includes mapping the first query topic to a first topic cluster at a first node of a hierarchical model of a text database. The embodiment also includes generating query demand data indicative of demand for the first topic cluster based on user queries of the text database. The embodiment also includes identifying the first topic cluster as a first topic-cache candidate based on the query demand data. The embodiment also includes comparing a first required amount of memory required for storing text associated with the first topic cluster to available cache memory in a database cache. The embodiment also includes storing, responsive to identifying the first topic cluster as the first topic-cache candidate and determining that the available cache memory is greater than the first required amount of memory, the text associated with the first topic cluster in the database cache. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
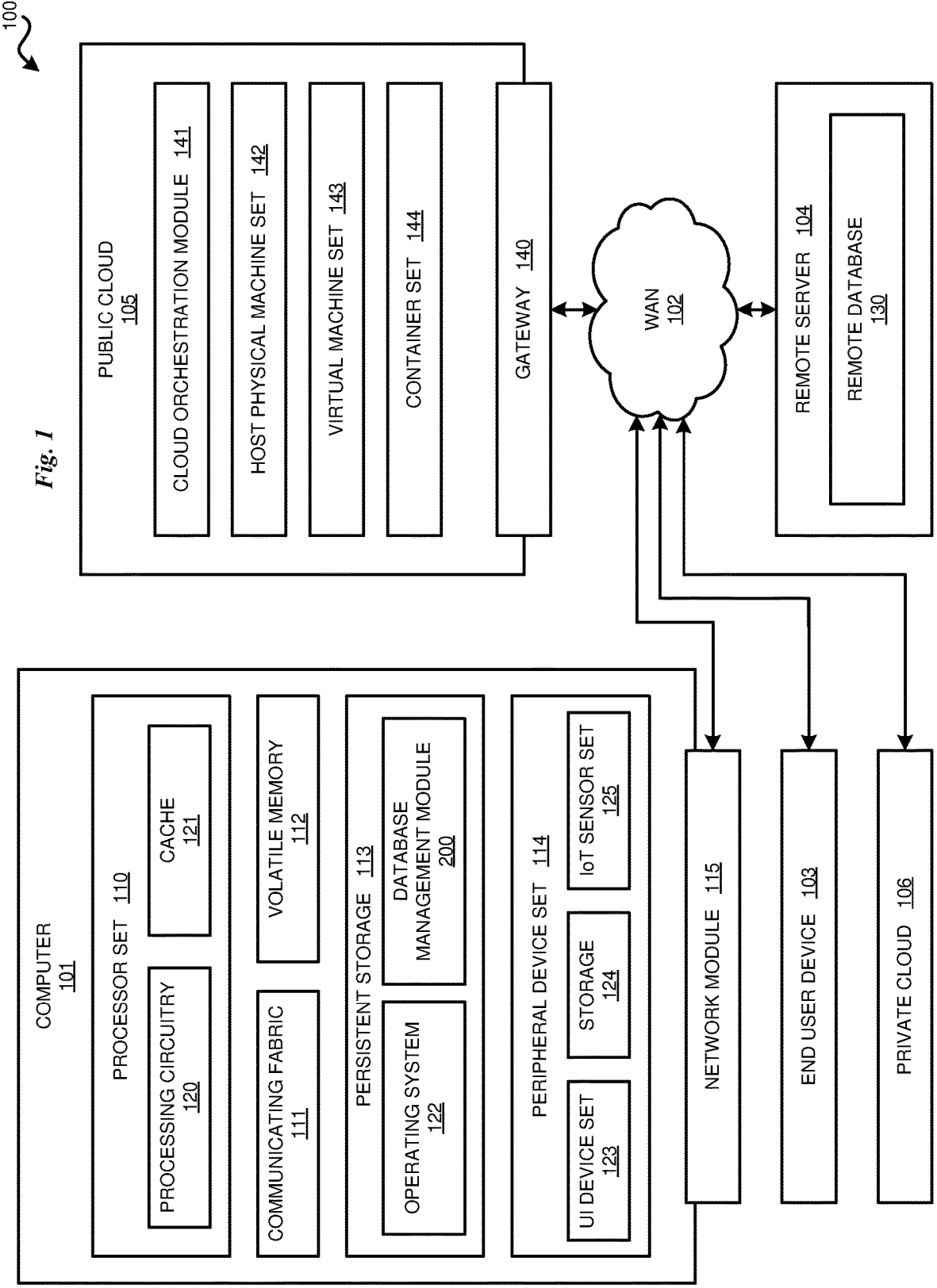
FIG. 1 depicts a block diagram of a computing environment in accordance with an illustrative embodiment.

A typical information retrieval system performs several NLP tasks, including NLP tasks on ingested documents and NLP tasks on user queries. Hereinafter, a request for information presented in any correct or incorrect, complete or incomplete, colloquial or formal, grammatical form of a natural language, during a conversation occurring with an illustrative embodiment described herein, is interchangeably referred to as a "question" or "query" unless expressly disambiguated where used.

The NLP tasks performed on ingested documents can be grouped into first-order NLP tasks and second-order NLP tasks. First-order NLP tasks include such things as sentence segmentation, tokenization, and text stemming or lemmatization. Compared to first-order NLP tasks, second-order NLP tasks are more complex and therefore tend to be more expensive in terms of time and processing. Second-order NLP tasks include such things as dependency parsing, entity recognition, and part-of-speech (POS) detection.

First-order NLP tasks can be performed on incoming documents as part of the document ingestion process. Second-order NLP tasks are performed at runtime as the information retrieval system attempts to generate a best response to a user's query. In a typical information retrieval system, each time the system receives a user query, it performs several tasks in order to generate an answer, including the second-order NLP tasks. These tasks allow the system to select relevant data from a text database, analyze the data for relevant information, and transform the data into an answer. Since many of these tasks are complex and computationally expensive, they present a barrier to optimizing and improving the overall performance of information retrieval systems.

Aspects of the present disclosure address the deficiencies described above by providing mechanisms (e.g., systems, methods, machine-readable media, etc.) that selectively cache the results of certain text analytics processes in a cache memory. Illustrative embodiments recognize that, because of the complex and computationally expensive nature of such processes, the efficiency and performance of an information retrieval system can be significantly improved by caching and reusing the results rather than repeating the processes for each incoming query. Thus, in a database management system (DBMS) such as may be used for an information retrieval system, the results of second-order NLP tasks are selectively cached. Later queries involving the data for which the NLP results have been cached are more quickly answered by retrieving the cached results rather than repeating the second-order NLP tasks on the same text data.

In an illustrative embodiment, a disclosed process ingests documents into a text database and selectively caches the results of second-order NLP tasks in order to improve the performance associated with generating an answer to a user query. In some embodiments, the process performs first-order NLP preprocessing tasks on incoming text documents and stores the preprocessed lines of text in a database. In some embodiments, the process performs the NLP tasks on each of the documents individually. The NLP tasks may include any desired preprocessing tasks from among many such known preprocessing techniques depending on implementation-specific goals, priorities, document types, and other considerations. As an example, in some embodiments, the NLP preprocessing tasks include sentence segmentation, tokenization, stopwords removal, and/or text normalization.

In some embodiments, the process identifies topics from the text of the incoming text documents. There are many known topic recognition algorithms that can be used, for example bag-of-words and Latent Dirichlet Allocation (LDA) techniques.

In some embodiments, the process performs sentiment analysis on the lines of text associated with the identified topics. In some embodiments, the process uses known techniques to identify sentiments in the text of the documents. In some embodiments, the process performs line or sentence level sentiment analysis in which each line or sentence is analyzed and identified with a sentiment polarity. In some embodiments, the process performs sentiment analysis using a machine learning algorithm, such as a deep neural network (DNN) that is trained to classify text according to a plurality of sentiments using labeled training data. In some such embodiments, the training data includes exemplary text that is labeled according to the sentiments that the machine learning model is being trained to recognize. In alternative embodiments, the process uses a rule-based algorithm that is based on manually created lexicons that define positive and negative strings of words. The rule-based algorithm then analyzes the amounts of positive and negative words to see which ones dominate. In still further embodiments, the process uses a hybrid algorithm that combines the machine-learning and rule-based approaches described above. In some embodiments, the process identifies the polarity of text of the documents as positive, neutral, or negative. In some embodiments, the process identifies additional polarity categories (e.g., very positive, positive, neutral, negative, very negative) In alternative embodiments, the process further identifies other types of emotions (e.g., anger, happiness, sadness, etc.), urgency (urgent, not urgent), and/or intentions (interested, not interested).

In some embodiments, the process applies a clustering algorithm to the lines of text based on the identified topics and sentiments. In some embodiments, the process uses a known technique that determines sets of topics and sentiments that form clusters. In some embodiments, the process uses a k-means algorithm to identify clusters of tokens or sentences associated with semantically similar topics and sentiments. In some embodiments, the process computes Euclidean distances between embedded tokens or sentences to identify clusters, where the distance is indicative of relatedness or closeness. In some embodiments, process includes an algorithm for k-medoids clustering, connectivity-based clustering, centroid-based clustering, distribution-based clustering, density-based clustering, fuzzy clustering, biclustering, and/or any other suitable clustering model.

In some embodiments, the process constructs a hierarchical topic model based on the topic and sentiment clusters. In some embodiments, of the hierarchical topic model is embodied as a dendrogram. In some embodiments, the hierarchical topic model has nodes that are associated with respective topics and sentiments that are arranged in a hierarchical manner.

In some embodiments, the process receives user queries and uses the information in the text database to generate answers to the user queries. In some embodiments, the process matches topics and sentiments identified in user queries to topics and sentiments of the hierarchical topic model. In some embodiments, the process performs second-order NLP tasks on lines of text in the database associated with matched topics and sentiments of the hierarchical topic model. In some embodiments, the second-order NLP tasks include dependency parsing, entity recognition, and part-of-speech (POS) detection. In some embodiments, the process generates demand data indicative of the demand for topics and sentiments in hierarchical topic model based on the user queries. In some embodiments, the demand data includes counts of how many times each node has been used to generate a response to a user query.

In some embodiments, the process caches results of second-order NLP tasks for lines of text associated with certain topics and/or sentiments. In some embodiments, the process identifies topics and/or sentiments for caching based on user demand and subject to available cache memory space. In some embodiments, as the process traverses the hierarchical topic model for topic matching queries to nodes, the process maintains statistical data that includes a count for each node indicating the number of times that node has been used to answer a query. In some embodiments, the statistical data is collected and retained for a sliding window of time, such as the past n hours, so that the count for each node is indicative of the number of times that node has been used to answer a query in the past n hours.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved database management module 200 that provides for improved efficiency and performance of an information retrieval system by selectively caching the results of certain text analytics processes. In addition to database management module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and database management module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in database management module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in database management module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
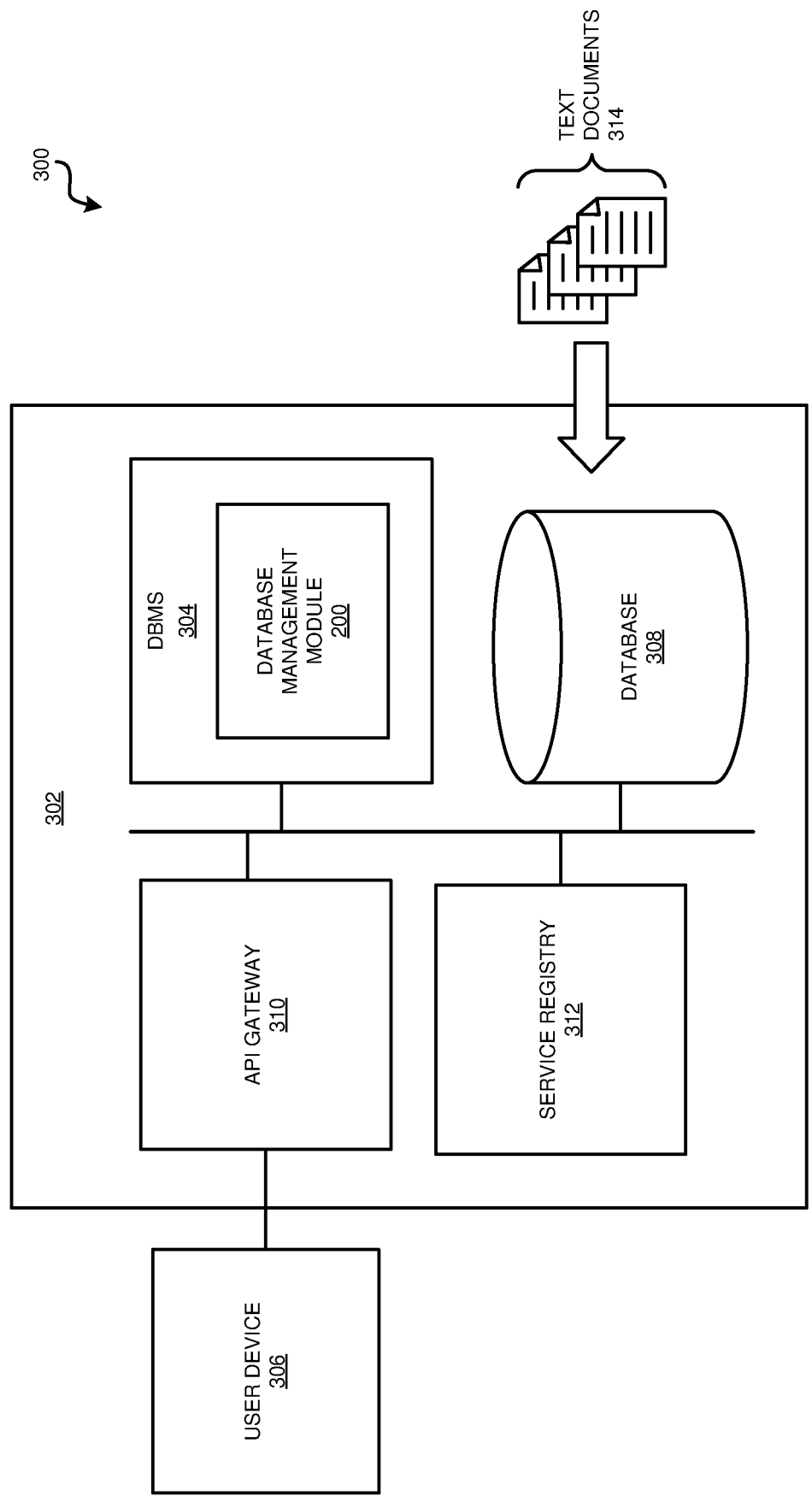
FIG. 2 depicts a block diagram of an example cloud computing environment in accordance with an illustrative embodiment.

With reference to FIG. 2, this figure depicts a block diagram of an example cloud computing environment 300 in accordance with an illustrative embodiment. In the illustrated embodiment, the cloud computing environment 300 includes service infrastructure 302 that includes a database management system (DBMS) 304 designed for administering database 308 in accordance with an illustrative embodiment. In some embodiments, the database 308 is a text database 308 that stores raw text ingested from one or more documents 314. In some embodiments, the DBMS 304 is an example of the computer 101 of FIG. 1 and includes a database management module 200.

In the illustrated embodiment, the service infrastructure 302 provides services and service instances to a user device 306. User device 306 communicates with service infrastructure 302 via an Application Programming Interface (API) gateway 310. In various embodiments, service infrastructure 302 and its DBMS 304 serve multiple users and multiple tenants. A tenant is a group of users (e.g., a company) who share a common access with specific privileges to the software instance. Service infrastructure 302 ensures that tenant specific data is isolated from other tenants.

In the illustrated embodiment, service infrastructure 302 includes a service registry 312. In some embodiments, service registry 312 looks up service instances of data discovery system 306 in response to a service lookup request such as one from API gateway 310 in response to a service request from user device 306. For example, in some embodiments, the service registry 312 looks up service instances of DBMS 304 in response to requests related to searching the database 308.

In some embodiments, service registry 312 maintains information about the status or health of each service instance including performance information associated each of the service instances. In some such embodiments, such information may include various types of performance characteristics of a given service instance (e.g., cache metrics, etc.) and records of updates.

In some embodiments, user device 306 connects with API gateway 310 via any suitable network or combination of networks such as the Internet, etc. and uses any suitable communication protocols such as Wi-Fi, Bluetooth, etc. Service infrastructure 302 may be built on the basis of cloud computing. API gateway 310 provides access to client applications like the DBMS 304 and the database 308. API gateway 310 receives service requests issued by client applications and creates service lookup requests based on service requests. As a non-limiting example, in an embodiment, the user device 306 executes a routine to initiate a database query request that is transmitted to the DBMS 304. Also, in some embodiments, the user accesses the DBMS 304 indirectly through the use of a web application or web browser running on the user device 306 that interacts with the DBMS 304 via the API gateway 310.

Figure 3:
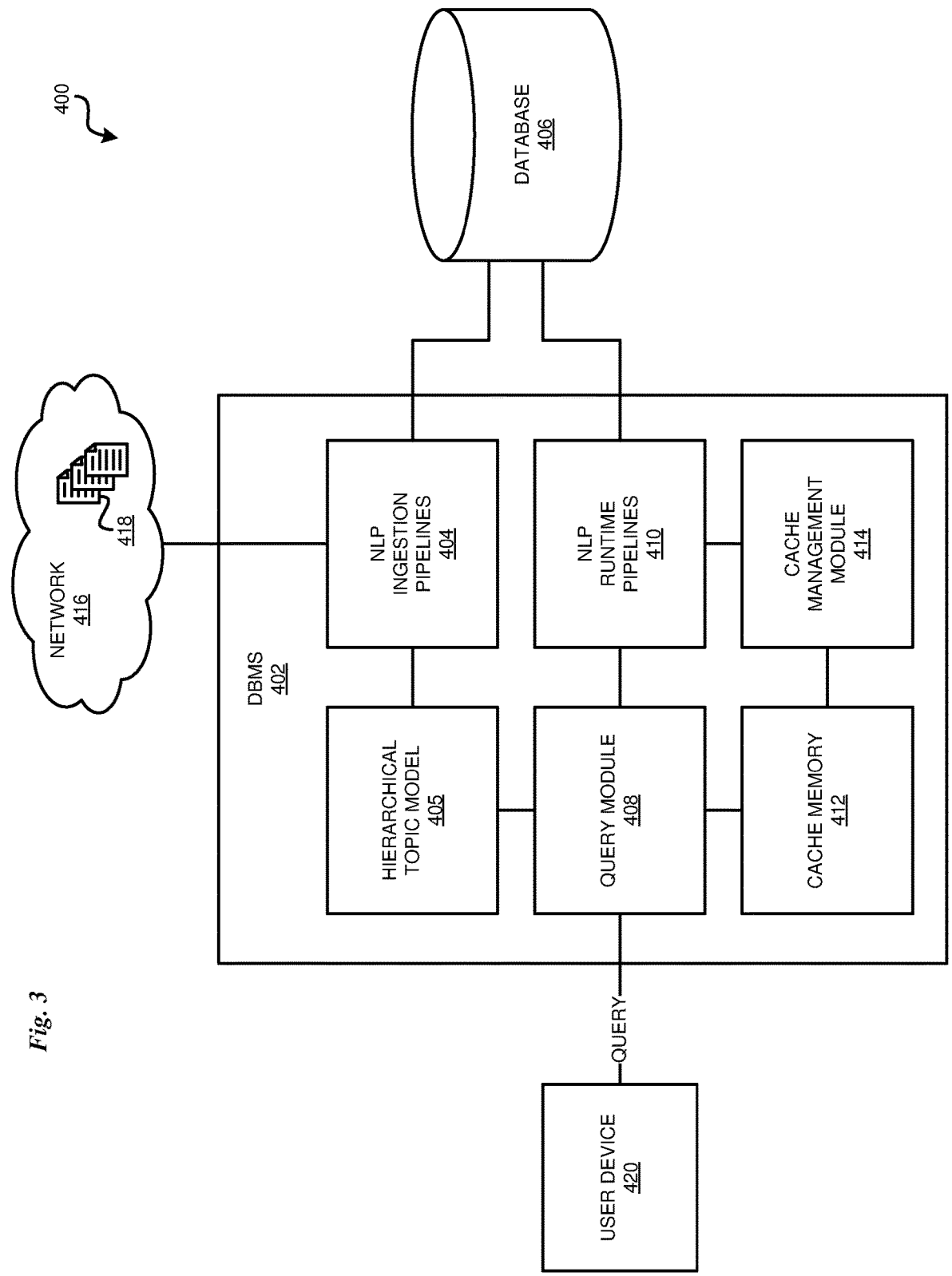
FIG. 3 depicts a block diagram of an example database environment in accordance with an illustrative embodiment.

With reference to FIG. 3, this figure depicts a block diagram of an example database environment 400 in accordance with an illustrative embodiment. The example embodiment includes a DBMS 402 designed for administering database 406 in accordance with an illustrative embodiment. In some embodiments, the DBMS 402 is an example of the DBMS 304 of FIG. 2, and the database 406 is an example of the database 308 of FIG. 2.

In the illustrated embodiment, the DBMS 402 generally includes NLP ingestion pipelines 404, a hierarchical topic model 405, a query module 408, NLP runtime pipelines 410, cache memory 412, and cache management module 414. In some embodiments, one or more of the NLP ingestion pipelines 404, a hierarchical topic model 405, a query module 408, NLP runtime pipelines 410, cache memory 412, and cache management module monitored applications and services 414 constitute an example of the database management module 200 of FIG. 1. In alternative embodiments, the DBMS 402 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the DBMS 402 ingests documents 418. The ingestion process includes first-level NLP processing by the NLP ingestion pipelines 404, which includes identifying topics in the documents 418. The DBMS 402 stores the processed documents 418 in a raw text database 406 and uses the identified topics to construct a hierarchical topic model 405.

The DBMS 402 includes a query module 408 that receives queries, for example from user device 420, and generates an answer by matching query topics to topics on the hierarchical topic model 405. The query module 408 then fetches cached second-order NLP results, if available, from the cache memory 412 for the matched topics and uses the cached NLP results to generate an answer. Otherwise, the NLP runtime pipelines 410 perform second-order NLP processing on the matched topics, and the query module 408 uses the NLP processing results to generate an answer.

In the illustrated embodiment, the DBMS 402 applies NLP on the documents 418 during ingestion and while composing an answer to a user query (i.e., at runtime). The applied NLP includes basic first-order NLP tasks, such as lemmatization and tokenization, and also includes more complex second-order NLP tasks, such as dependency parsing, entity recognition, and part-of-speech (POS) detection. In the illustrated embodiment, the NLP ingestion pipelines 404 perform first-order NLP tasks on documents 418 as they are ingested, and the NLP runtime pipelines 410 perform the more complex and computationally expensive second-order NLP tasks at runtime on various chunks of text in the database 406 based on received queries.

In the illustrated embodiment, the DBMS 402 includes a cache management module 414 that selectively stores the results of the second-order NLP tasks in the cache memory 412. Because of the complex and computationally expensive nature of the second-order NLP tasks, disclosed embodiments realize a significant improvement in the efficiency of the DBMS 402 by caching the results of the second-order NLP tasks for certain chunks of data. Later queries involving these chunks of data are more quickly answered by retrieving the second-order NLP results from the cache memory 412 rather than repeating the second-order NLP tasks.

Figure 4:
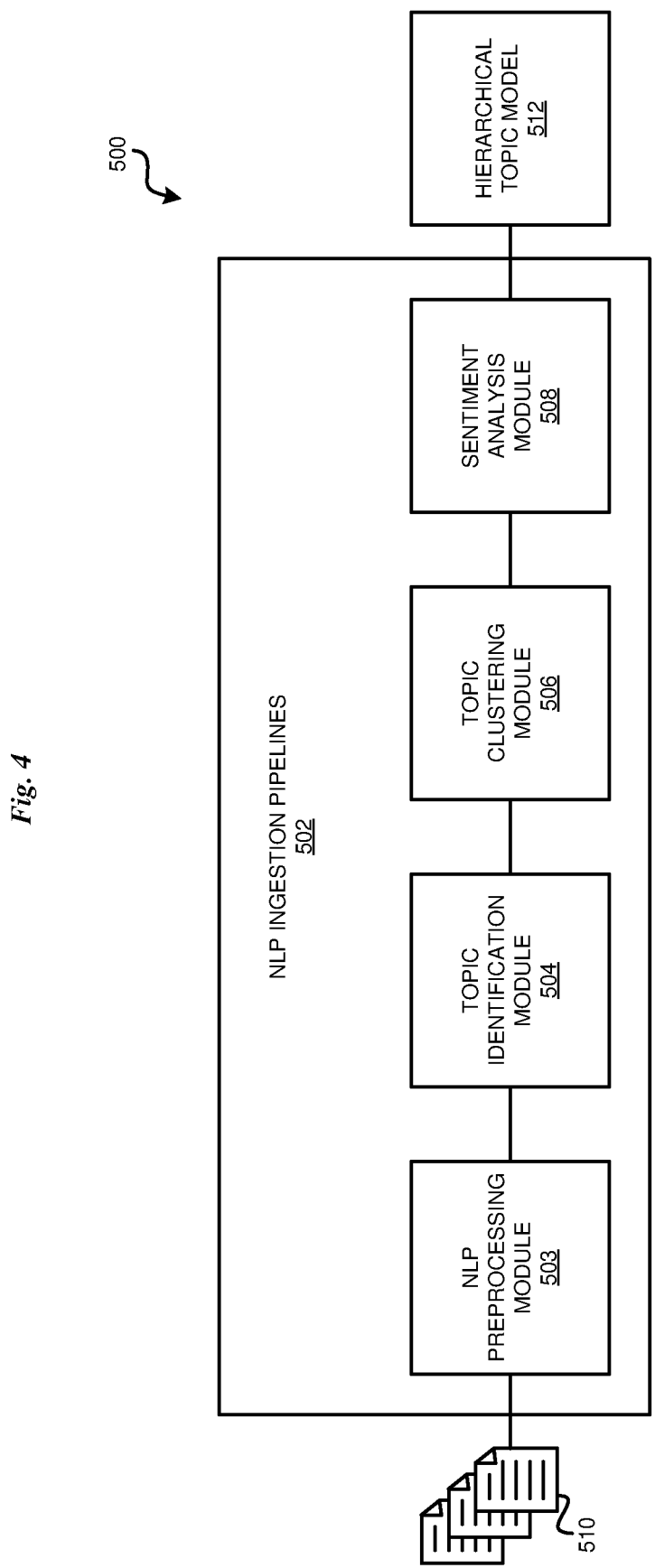
FIG. 4 depicts a block diagram of an ingestion section of a DBMS in accordance with an illustrative embodiment.

With reference to FIG. 4, this figure depicts a block diagram of an ingestion section 500 of a DBMS in accordance with an illustrative embodiment. In some embodiments, the ingestion section 500 is an example of the ingestion section of the DBMS 402 of FIG. 3, where the NLP ingestion pipelines 502 are an example of the NLP ingestion pipelines 404 of FIG. 3, and hierarchical topic model 512 is an example of the hierarchical topic model 405 of FIG. 3.

In the illustrated embodiment, the NLP ingestion pipelines 502 include an NLP preprocessing module 503, a topic identification module 504, a topic clustering module 506, and a sentiment analysis module 508. In alternative embodiments, the NLP ingestion pipelines 502 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the NLP ingestion pipelines 502 receives documents 510 for ingestion into a database (e.g., database 406 of FIG. 3). In order to facilitate searches of the ingested text, the NLP ingestion pipelines 502 also constructs the hierarchical topic model 512. In some embodiments, the hierarchical topic model 512 has nodes that are associated with respective topics that are arranged in a hierarchical manner. These topic nodes can be searched for topic matching with incoming queries much faster than other types of text matching techniques, such as logical structure comparisons.

In some embodiments, each of the documents 510 is processed individually by the NLP ingestion pipelines 502. The NLP preprocessing module 503 performs any desired preprocessing tasks from among many such known preprocessing techniques depending on implementation-specific goals, priorities, document types, and other considerations. As an example, in some embodiments, the NLP preprocessing module 503 removes stopwords and normalizes the text using a stemming or lemmatization technique.

Figure 5:
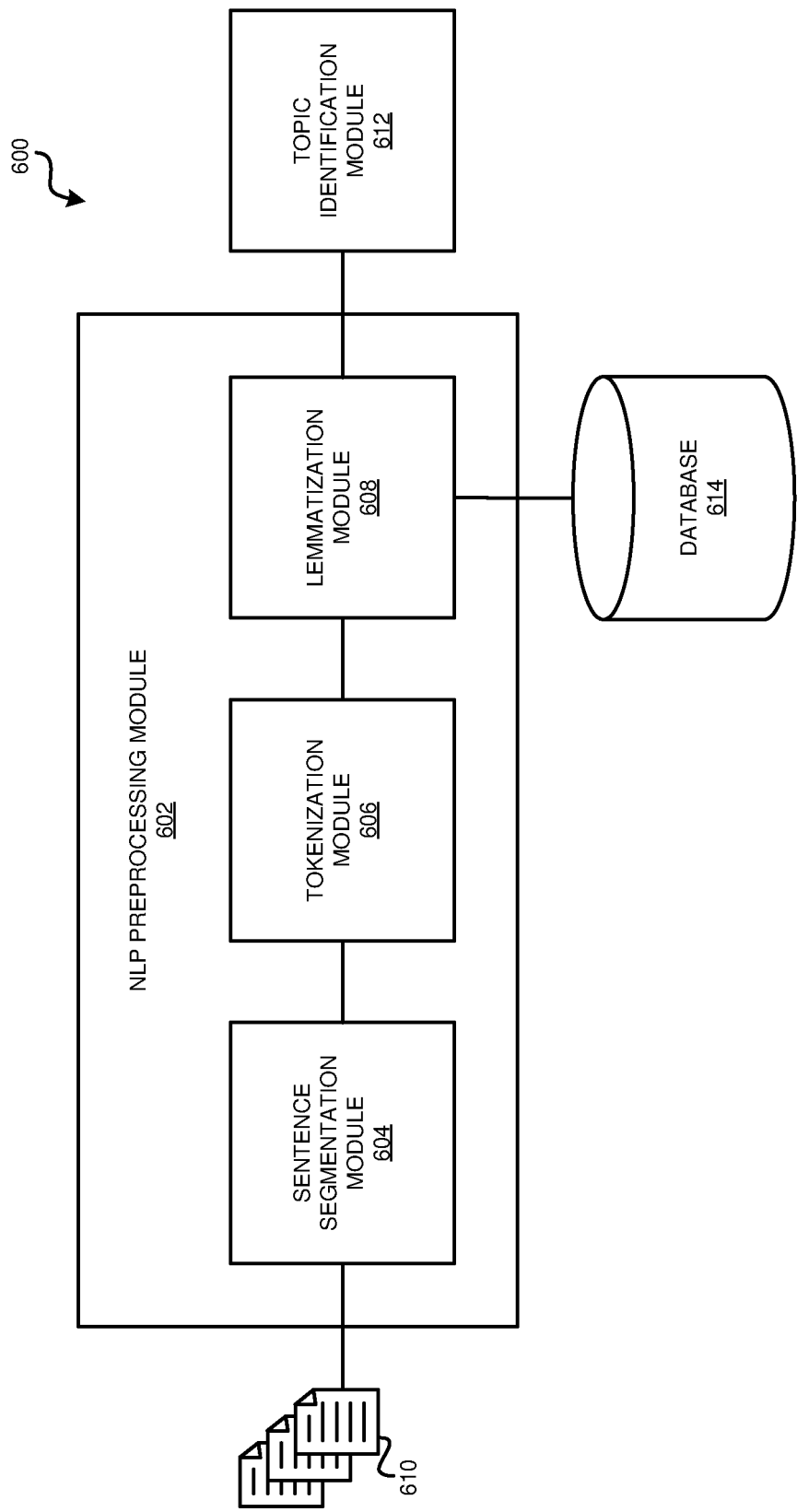
FIG. 5 depicts a block diagram of NLP pipelines having an NLP preprocessing module in accordance with an illustrative embodiment.

With reference to FIG. 5, this figure depicts a block diagram of NLP pipelines 600 having a NLP preprocessing module 602, which is an example of the NLP preprocessing module 503 of FIG. 4 in accordance with an illustrative embodiment. In the example shown in FIG. 5, the NLP preprocessing module 602 receives documents 610 for ingestion into a database 614, which is an example of database 406 of FIG. 3, and for constructing a topic identification module 612, which is an example of hierarchical topic model 512 of FIG. 4.

In the illustrated embodiment, the NLP preprocessing module 602 includes a sentence segmentation module 604, a tokenization module 606, and a lemmatization module 608. In alternative embodiments, the NLP preprocessing module 602 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The sentence segmentation module 604 applies known techniques to identify sentence boundaries in a document. The tokenization module 606 separates the text into a set of component elements called tokens. A token is usually a word, although sometimes it may be some other unknown symbol. An example of a simple tokenization technique involves splitting the text according to spaces and punctuation marks.

The lemmatization module 608 performs text normalization that is comparable to stemming. Both Stemming and lemmatization generate a catalog of related words to help the DBMS recognize word variations. In some embodiments, stemming can be used in place of lemmatization, however lemmatization generally produces more thorough results. Stemming generally involves removing letters from the end of a word until the stem or root of the word in reached (e.g., reducing steering to steer or boating to boat). Lemmatization involves a morphological analysis that looks beyond word reduction and considers a language's vocabulary (e.g., associating mouse as the singular form of mice).

Referring back again to FIG. 4, the NLP ingestion pipelines 502 also includes a topic identification module 504 that identifies topics in the incoming documents 510. There are many known topic recognition algorithms that can be used for the topic identification module 504. Non-limiting examples of topic identification techniques that can be used for the topic identification module 504 include bag-of-words and Latent Dirichlet Allocation (LDA) techniques. In the illustrated embodiment, the topics identified by the topic identification module 504 are provided to a topic clustering module 506.

Figure 6:
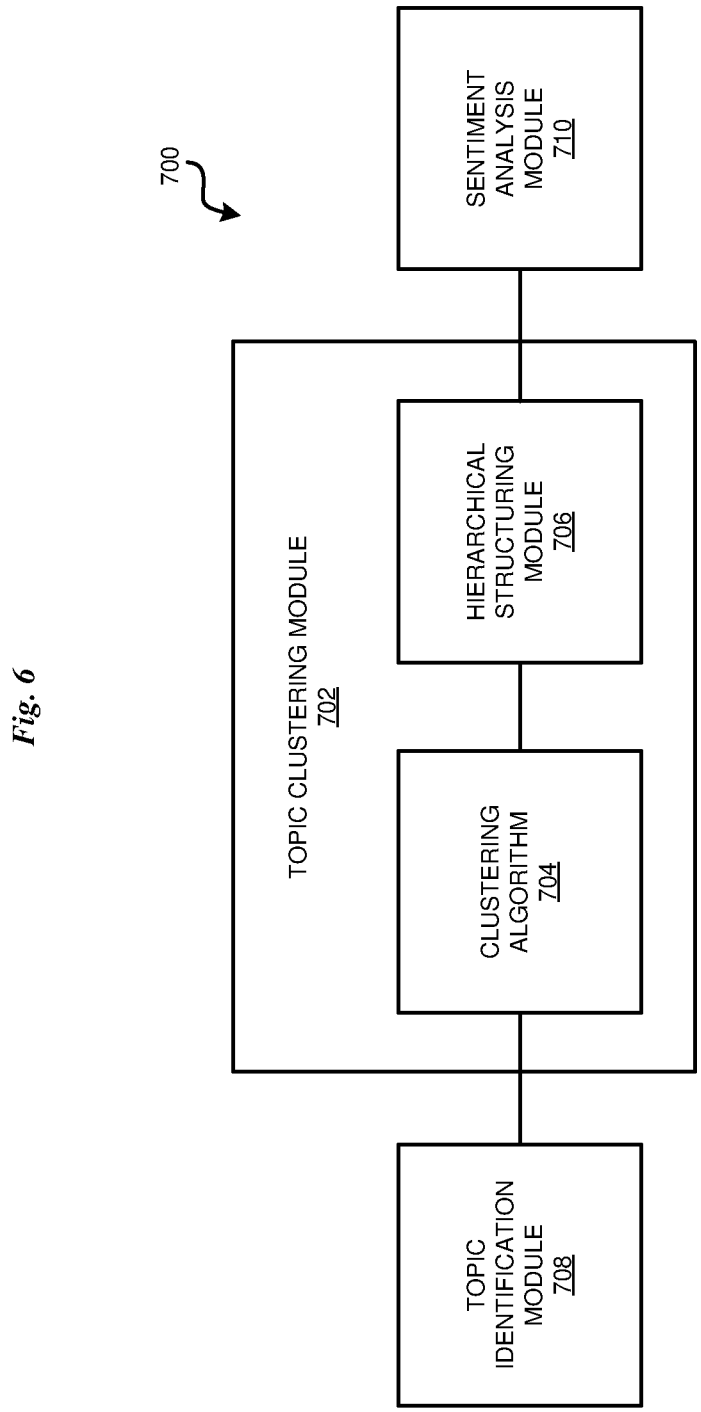
FIG. 6 depicts a block diagram of NLP pipelines having a topic clustering module in accordance with an illustrative embodiment.

With reference to FIG. 6, this figure depicts a block diagram of NLP pipelines 700 having a topic clustering module 702, which is an example of the topic clustering module 506 of FIG. 4 in accordance with an illustrative embodiment. In the example shown in FIG. 6, the topic clustering module 702 receives topic data from a topic identification module 708, which is an example of topic identification module 504 of FIG. 4, and provides the topic clustering results to a sentiment analysis module 710, which is an example of the sentiment analysis module 508 of FIG. 4.

In the illustrated embodiment, the topic clustering module 702 includes a clustering algorithm 704 and a hierarchical structuring module 706. In alternative embodiments, the topic clustering module 702 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, clustering algorithm 704 uses a known technique that determines sets of topics that form clusters. In some embodiments, the clustering algorithm 704 includes a k-means algorithm to identify clusters of tokens or sentences associated with semantically similar topics. In some embodiments, the clustering algorithm 704 computes Euclidean distances between embedded tokens or sentences to identify clusters, where the distance is indicative of relatedness or closeness. In some embodiments, the clustering algorithm 704 includes an algorithm for k-medoids clustering, connectivity-based clustering, centroid-based clustering, distribution-based clustering, density-based clustering, fuzzy clustering, biclustering, and/or any other suitable clustering model.

In the illustrated embodiment, topic cluster data from the clustering algorithm 704 is provided to the hierarchical structuring module 706. The hierarchical structuring module 706 uses the topic cluster data to construct a hierarchical topic clustering model (e.g., hierarchical topic model 405 of FIG. 3). In some embodiments, the hierarchical structuring module 706 constructs a dendrogram having nodes associated with respective topics. In alternative embodiments, the clustering algorithm 704 generates a hierarchical topic clustering model, such as a dendrogram.

Referring back again to FIG. 4, the NLP ingestion pipelines 502 also includes a sentiment analysis module 508. In some embodiments, the hierarchical topic model 512 includes both topic information and sentiment information. In some such embodiments, the sentiment analysis module 508 performs sentiment analysis on text associated with identified topics.

The sentiment analysis module 508 performs the sentiment analysis in order to identify context information that will be used in building the hierarchical topic model 512. For example, an identified topic may be associated with two different nodes, where one node is further associated with a positive sentiment and the other node is further associated with a negative sentiment. In some embodiments, a third node could be associated with the same topic, but further associated with a neutral sentiment. Thus, in some embodiments, the hierarchical topic model 512 has nodes that are associated with unique respective topics, and in alternative embodiments, the hierarchical topic model 512 has nodes that are associated with unique respective combinations of a topic and a sentiment.

The sentiment analysis module 508 uses known techniques to identify sentiment in the text of the documents 510. In some embodiments, the sentiment analysis module 508 performs line or sentence level sentiment analysis in which each line or sentence is analyzed and identified with a sentiment polarity. In some embodiments, the sentiment analysis module 508 performs sentiment analysis using a machine learning algorithm, such as a deep neural network (DNN) that is trained to classify text according to a plurality of sentiments using labeled training data. In some such embodiments, the training data includes exemplary text that is labeled according to the sentiments that the sentiment analysis module 508 is being trained to recognize. In alternative embodiments, the sentiment analysis module 508 uses a rule-based algorithm that is s based on manually created lexicons that define positive and negative strings of words. The rule-based algorithm then analyzes the amounts of positive and negative words to see which ones dominate. In still further embodiments, the sentiment analysis module 508 uses a hybrid algorithm that combines the machine-learning and rule-based approaches described above.

In some embodiments, the sentiment analysis module 508 identifies the polarity of text of the documents 510 as positive, neutral, or negative. In some embodiments, the sentiment analysis module 508 identifies additional polarity categories (e.g., very positive, positive, neutral, negative, very negative) In alternative embodiments, the sentiment analysis module 508 further identifies other types of emotions (e.g., anger, happiness, sadness, etc.), urgency (urgent, not urgent), and/or intentions (interested, not interested).

Figure 7:
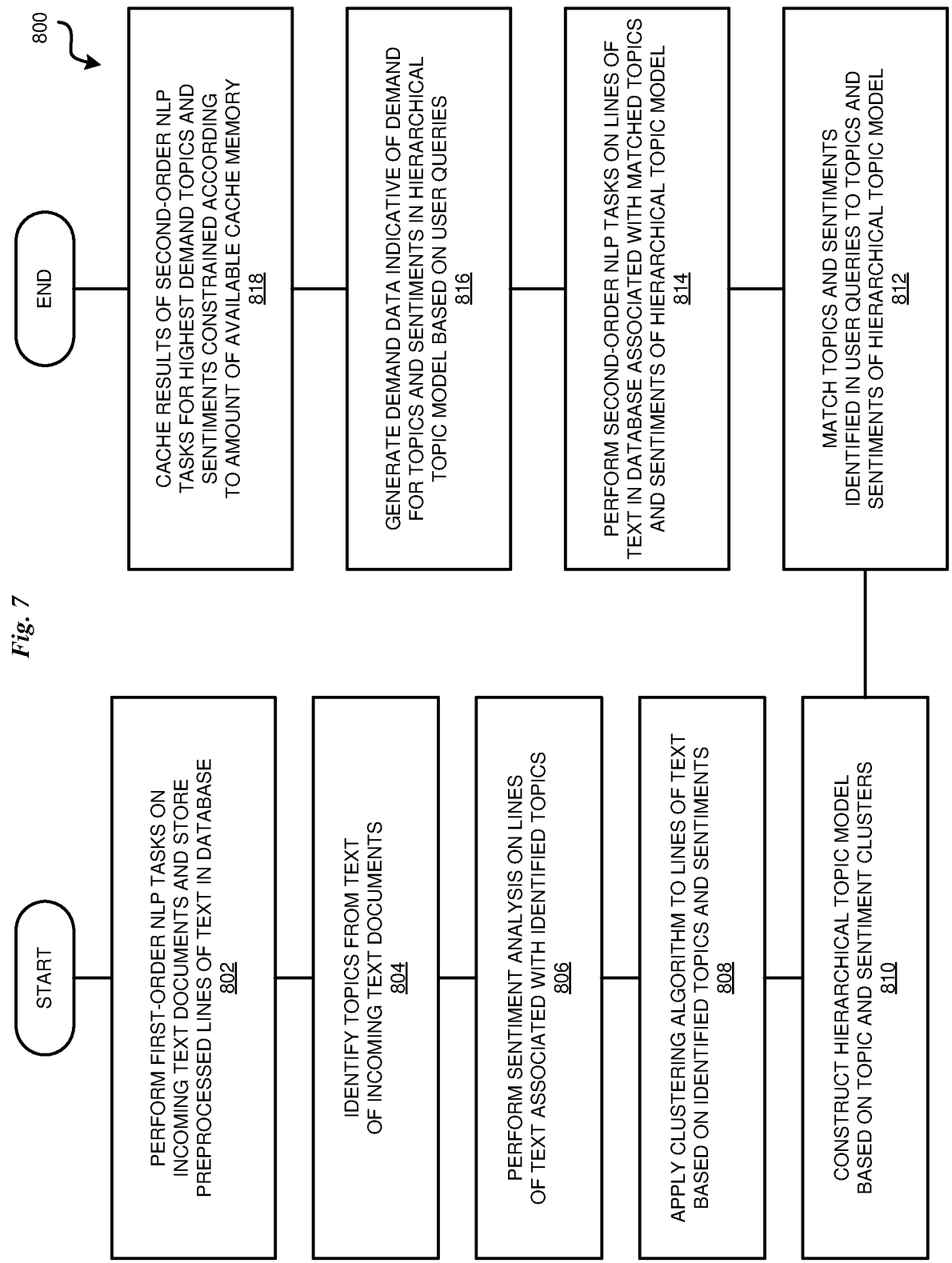
FIG. 7 depicts a flowchart of an example process for processing documents into a document database and selective caching of processing results in accordance with an illustrative embodiment.

With reference to FIG. 7, this figure depicts a flowchart of an example process 800 for processing documents into a document database and selective caching of processing results in accordance with an illustrative embodiment. In a particular embodiment, the DBMS 402 of FIG. 3 carries out the process 800.

In the illustrated embodiment, at block 802, the process performs first-order NLP preprocessing tasks on incoming text documents and stores the preprocessed lines of text in a database. In some embodiments, the process performs the NLP tasks on each of the documents individually. The NLP tasks may include any desired preprocessing tasks from among many such known preprocessing techniques depending on implementation-specific goals, priorities, document types, and other considerations. As an example, in some embodiments, the NLP preprocessing tasks include sentence segmentation, tokenization, stopwords removal, and/or text normalization.

Next, at block 804, the process identifies topics from the text of the incoming text documents. There are many known topic recognition algorithms that can be used, for example bag-of-words and Latent Dirichlet Allocation (LDA) techniques.

Next, at block 806, the process performs sentiment analysis on the lines of text associated with the identified topics. In some embodiments, the process uses known techniques to identify sentiments in the text of the documents. In some embodiments, the process performs line or sentence level sentiment analysis in which each line or sentence is analyzed and identified with a sentiment polarity. In some embodiments, the process performs sentiment analysis using a machine learning algorithm, such as a deep neural network (DNN) that is trained to classify text according to a plurality of sentiments using labeled training data. In some such embodiments, the training data includes exemplary text that is labeled according to the sentiments that the machine learning model is being trained to recognize. In alternative embodiments, the process uses a rule-based algorithm that is s based on manually created lexicons that define positive and negative strings of words. The rule-based algorithm then analyzes the amounts of positive and negative words to see which ones dominate. In still further embodiments, the process uses a hybrid algorithm that combines the machine-learning and rule-based approaches described above. In some embodiments, the process identifies the polarity of text of the documents as positive, neutral, or negative. In some embodiments, the process identifies additional polarity categories (e.g., very positive, positive, neutral, negative, very negative) In alternative embodiments, the process further identifies other types of emotions (e.g., anger, happiness, sadness, etc.), urgency (urgent, not urgent), and/or intentions (interested, not interested).

Next, at block 808, the process applies a clustering algorithm to the lines of text based on the identified topics and sentiments. In some embodiments, the process uses a known technique that determines sets of topics and sentiments that form clusters. In some embodiments, the process uses a k-means algorithm to identify clusters of tokens or sentences associated with semantically similar topics and sentiments. In some embodiments, the process computes Euclidean distances between embedded tokens or sentences to identify clusters, where the distance is indicative of relatedness or closeness. In some embodiments, process includes an algorithm for k-medoids clustering, connectivity-based clustering, centroid-based clustering, distribution-based clustering, density-based clustering, fuzzy clustering, biclustering, and/or any other suitable clustering model.

Next, at block 810, the process constructs a hierarchical topic model based on the topic and sentiment clusters. In some embodiments, the hierarchical topic model has nodes that are associated with respective topics and sentiments that are arranged in a hierarchical manner.

In some embodiments, the process receives user queries and uses the information in the text database to generate answers to the user queries. At block 812, the process matches topics and sentiments identified in user queries to topics and sentiments of the hierarchical topic model. Next, at block 814, the process performs second-order NLP tasks on lines of text in the database associated with matched topics and sentiments of the hierarchical topic model. In some embodiments, the second-order NLP tasks include dependency parsing, entity recognition, and part-of-speech (POS) detection. Next, at block 816, the process generates demand data indicative of the demand for topics and sentiments in hierarchical topic model based on the user queries. In some embodiments, the demand data includes counts of how many times each node has been used to generate a response to a user query.

Next, at block 818, the process caches results of second-order NLP tasks for lines of text associated with certain topics and/or sentiments. In some embodiments, the process identifies topics and/or sentiments for caching based on user demand and subject to available cache memory space. In some embodiments, as the process traverses the hierarchical topic model for topic matching queries to nodes (at block 812), the process maintains statistical data that includes a count for each node indicating the number of times that node has been used to answer a query. In some embodiments, the statistical data is collected and retained for a sliding window of time, such as the past n hours, so that the count for each node is indicative of the number of times that node has been used to answer a query in the past n hours.

Figure 8:
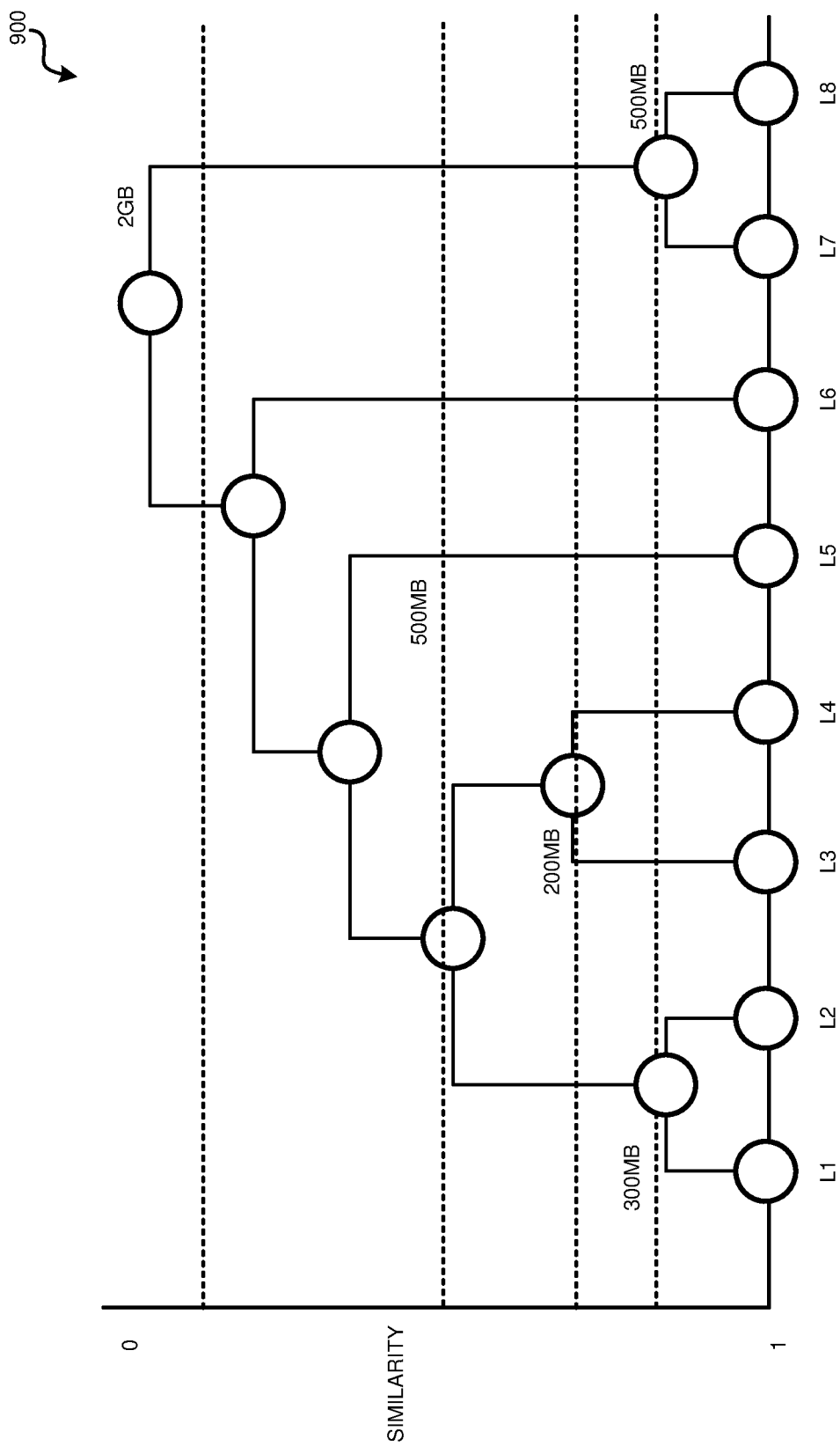
FIG. 8 depicts a hierarchical topic-clustering dendrogram in accordance with an illustrative embodiment.

With reference to FIG. 8, this figure depicts a hierarchical topic-clustering dendrogram 900 in accordance with an illustrative embodiment. In an exemplary embodiment, the dendrogram 900 is generated by the NLP ingestion pipelines 404 of FIG. 3. As discussed above, the process 800, the process identifies topics and/or sentiments for caching based on user demand and subject to available cache memory space.

In some embodiments, the process also maintains statistical data regarding the amount of memory space required for caching the various nodes of the hierarchical topic model embodied as a dendrogram 900 in FIG. 8. In the illustrated embodiment, the text analyzed to generate the dendrogram 900 includes lines of text grouped into eight topic-and-sentiment clusters at leaf nodes L1-L8. The clusters at nodes L1-L8 are further grouped at parent nodes based on similarities using distance measurements between embedded representations of the clusters. The vertical axis of the dendrogram 900 is representative of similarity with a value of 1 at the origin being most similar and a value of 0 furthest from the horizontal axis being least similar. Thus, topics and/or sentiments joined by lower (i.e., closer to the horizontal axis) parent nodes are more similar than topics and/or sentiments joined by other parent nodes that are shown higher in the dendrogram 900. The topics and/or sentiment clusters at leaf nodes L1-L8 are grouped in pairs at parent nodes, which in turn are further grouped at grandparent nodes, and so on until all are collected in a single node at the top of the dendrogram 900. Thus, the topics and/or sentiments represented by the top node are very general in nature since this cluster includes every topic and/or sentiment identified in ingested documents. The topics and/or sentiments represented by the leaf nodes L1-L8 are most specific, and the parent/grandparent/etc. nodes between the leaf nodes L1-L8 and the top node include varying degrees of specificity.

In some embodiments, the statistical data collected at block 818 of process 800 includes demand data for each node of the dendrogram 900, including leaf nodes L1-L8 and each of the parent/grandparent/etc. nodes that join the leaf nodes L1-L8. The process 800 may identify any of the leaf/parent/grandparent/etc. nodes for caching based on the demand data. Since the different nodes are more or less specific about various topics and/or sentiments, this allows the process to perform topic-based caching that caches data based on the topic associated with the data and further based on a level of granularity that coincides with recent user demand.

The broken lines in FIG. 8 are representative of potential cut lines that can be used for caching data. In the illustrated embodiment, the caching is subject to available space in the cache memory. In some embodiments, the process maintains data indicative of an amount of memory that would be needed to cache data at the various potential cut lines. For example, if the parent node joining L1 and L2 has a highest demand value and the cache memory has at least 300 MB of available space, then the results of the second-order NLP processing for the topic/sentiment at the parent node of L1 and L2 will be stored in the cache memory. In some embodiments, if a node having a high demand value requires more memory space than is available in the cache memory, then the process selects a child node having the highest demand, again subject to available cache memory space. For example, if the grandparent node joining the parent node of L1 and L2 with the parent node of L3 and L4 has a highest demand value, but the cache memory has less than 500 MB of available space, then the process looks at the two joined parent nodes; if the parent node joining L1 and L2 has a higher demand than the parent node joining L3 and L4 (and if the cache memory has at least 300 MB of available space) then the results of the second-order NLP processing for the topic/sentiment at the parent node of L1 and L2 will be stored in the cache memory.

Figure 9:
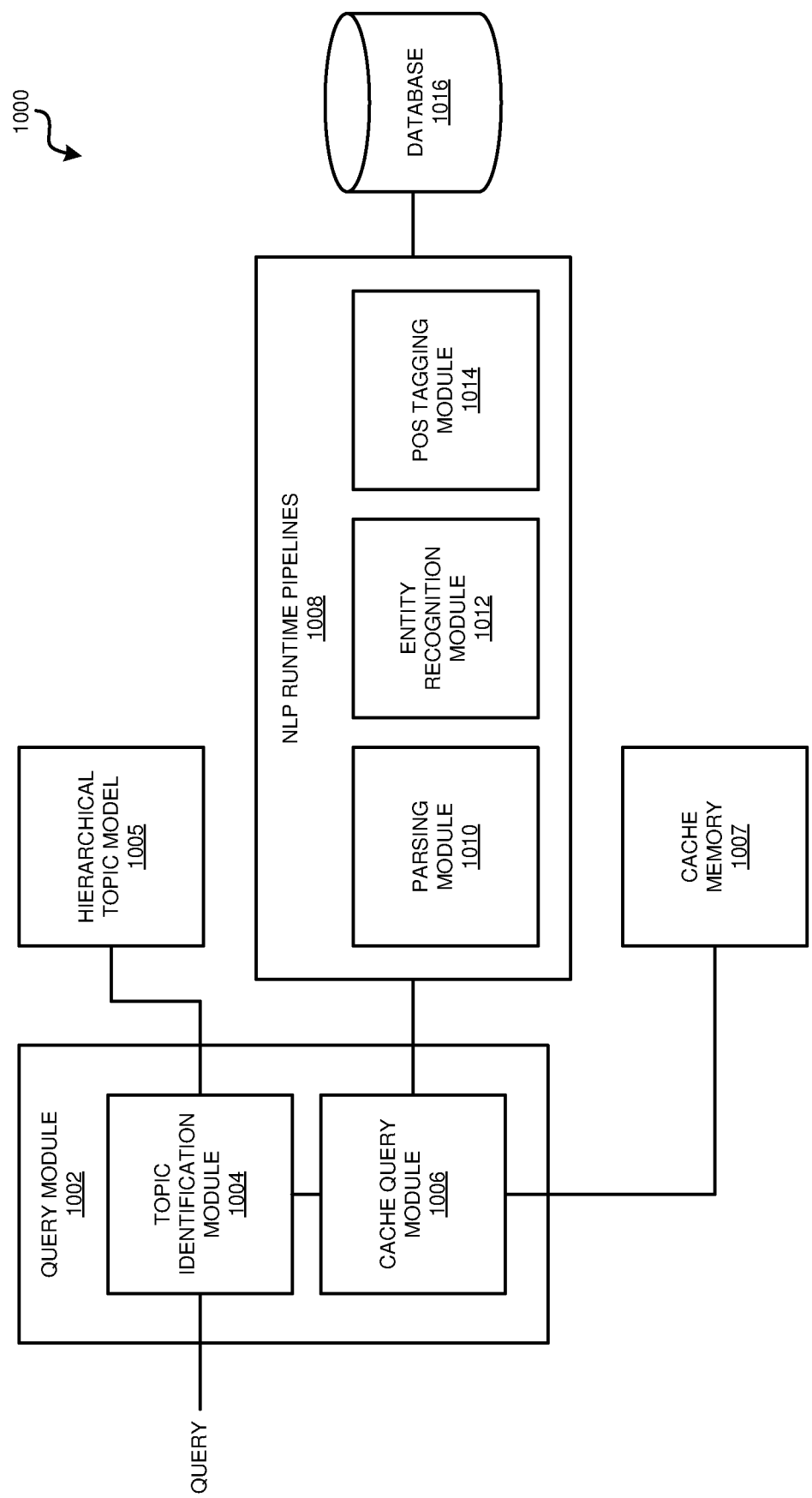
FIG. 9 depicts a block diagram of a query section of a DBMS in accordance with an illustrative embodiment.

With reference to FIG. 9, this figure depicts a block diagram of a query section of a DBMS 1000 in accordance with an illustrative embodiment. In some embodiments, the illustrated query section is an example of the query section of the DBMS 402 of FIG. 3.

In the illustrated embodiment, the DBMS 1000 includes a query module 1002, a hierarchical topic model 1005, a cache memory 1007, NLP runtime pipelines 1008, and database 1016. In some embodiments, the query module 1002 is an example of the query module 408 of FIG. 3, the NLP runtime pipelines 1008 are an example of the NLP runtime pipelines 410 of FIG. 3, the hierarchical topic model 1005 is an example of the hierarchical topic model 405 of FIG. 3, the cache memory 1007 is an example of the cache memory 412 of FIG. 3, and the database 1016 is an example of the database 406 of FIG. 3.

In the illustrated embodiment, the query module 1002 includes a topic identification module 1004 and a cache query module 1006. In alternative embodiments, the query module 1002 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The topic identification module 1004 identifies topics in the incoming user queries. There are many known topic recognition algorithms that can be used for the topic identification module 1004. Non-limiting examples of topic identification techniques that can be used for the topic identification module 1004 include bag-of-words and Latent Dirichlet Allocation (LDA) techniques. In the illustrated embodiment, topic identification module 1004 then uses the identified topics to traverse the hierarchical topic model 1005 searching for a topic node having an associated topic that most closely matches that of the user query. Upon locating a topic node, the topic identification module 1004 passes data indicative of the selected node to the cache query module 1006.

The cache query module 1006 first searches the cache memory 1007 for second-order NLP results associated with the selected node. If available, then the query module 1002 uses the cached second-order NLP results to formulate an answer to the query. Otherwise, if not available, then the cache query module 1006 sends the selected node data to the NLP runtime pipelines 1008.

In the illustrated embodiment, the NLP runtime pipelines 1008 includes a parsing module 1010, an entity recognition module 1012, and a part-of-speech (POS) tagging module 1014. In alternative embodiments, the NLP runtime pipelines 1008 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the NLP runtime pipelines 1008 receives topic information for a node of the hierarchical topic model 1005 that matches a user query. The NLP runtime pipelines 1008 retrieves text from the database 1016 that is associated with the selected node. The NLP runtime pipelines 1008 then perform second-order NLP tasks on the retrieved text in order to extract information that can be used to answer the user query. The second-order NLP tasks can vary; the parsing module 1010, entity recognition module 1012, and POS tagging module 1014 are shown as non-limiting examples. The second-order NLP tasks generally involve advanced methodologies that are relatively expensive in terms of time and processing compared to the first-order NLP tasks discussed above (e.g., the NLP tasks performed by NLP ingestion pipelines 404 of FIG. 3).

In some embodiments, the POS tagging module 1014 classifies and labels words into appropriate parts of speech, such as noun, verb, adjective, adverb, conjunction, pronoun and other categories. In some embodiments, the POS tagging module 1014 uses a known rule-based POS tagging methodology that uses the context of a word, e.g. surrounding words, to determine an appropriate POS tag. In alternative embodiments, the POS tagging module 1014 uses a known stochastic POS tagging methodology that involves the uses of probabilities, e.g., where a POS tag is selected for a word based on the probability of this tag occurring with the n preceding POS tags.

In some embodiments, the parsing module 1010 performs a dependency parsing process that uses known techniques for identifying the grammatical structure of a sentence or line of text and determines the relationships between the words in that sentence/line. In some embodiments, the entity recognition module 1012 performs a named entity recognition process that classifies parts of texts into categories, including persons, categories, places, quantities and other entities.

Figure 10:
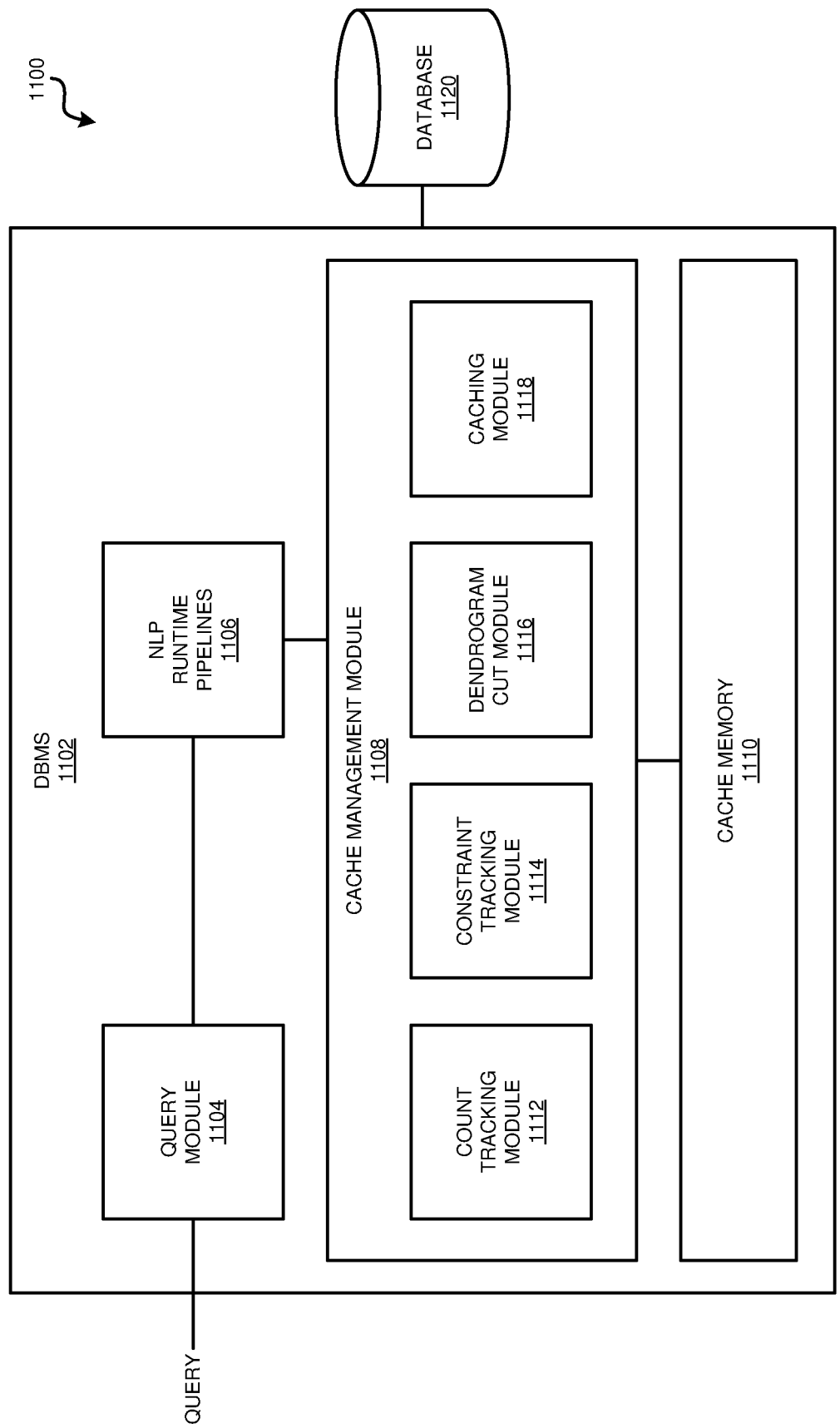
FIG. 10 depicts a block diagram of a caching section of a DBMS in accordance with an illustrative embodiment.

With reference to FIG. 10, this figure depicts a block diagram of a caching section 1100 of a DBMS 1102 in accordance with an illustrative embodiment. In some embodiments, the illustrated caching section 1100 of DBMS 1102 is an example of the caching section of the DBMS 402 of FIG. 3. In the illustrated embodiment, the DBMS 1100 includes a query module 1104, NLP runtime pipelines 1106, a cache management module 1108, and cache memory 1110. In some embodiments, the query module 1104 is an example of the query module 408 of FIG. 3, the NLP runtime pipelines 1106 are an example of the NLP runtime pipelines 410 of FIG. 3, the cache memory 1110 is an example of the cache memory 412 of FIG. 3, the cache management module 1108 is an example of the cache management module 414 of FIG. 3, and the database 1120 is an example of the database 406 of FIG. 3.

In the illustrated embodiment, the cache management module 1108 includes a count tracking module 1112, a constraint tracking module 1114, a dendogram cut module 1116, and a caching module 1118. In alternative embodiments, the cache management module 1108 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the cache management module 1108 identifies topics and/or sentiments for caching based on user demand and subject to available cache memory space. In some embodiments, the count tracking module 1112 maintains statistical data that includes a count for each node indicating the number of times that node has been used to answer a query. In some embodiments, the count tracking module 1112 collects and stores the count data for a sliding window of time, such as the past n hours, so that the stored count for each node is indicative of the number of times that node has been used to answer a query in the past n hours. In the illustrated embodiment, the constraint tracking module 1114 maintains data indicative of an amount of memory that would be needed to cache data at various potential cut lines. The dendogram cut module 1116 identifies cut lines at the various parent/grandparent/etc. nodes of the hierarchical topic model (e.g., as indicated by the broken lines in FIG. 8).

The caching module 1118 collects that demand data and memory requirements data generated by the count tracking module 1112 and constraint tracking module 1114. The caching module 1118 then uses the demand data and memory requirements data to identify nodes that satisfy caching priority requirements. For example, in some embodiments, the caching module 1118 caches the results of the second-order NLP processing performed by the NLP runtime pipelines 1106 for topics and/or sentiments for caching based on user demand and subject to available space in the cache memory 1110. For example, as described above in connection with FIG. 8, if the parent node joining L1 and L2 has a highest demand value and the cache memory has at least 300 MB of available space, then the caching module 1118 will store the results of the second-order NLP processing for the topic/sentiment at the parent node of L1 and L2 in the cache memory 1110. In some embodiments, if a node having a high demand value requires more memory space than is available in the cache memory, then the caching module 1118 selects a child node having the highest demand, again subject to available space in the cache memory 1110. For example, if the grandparent node joining the parent node of L1 and L2 with the parent node of L3 and L4 has a highest demand value, but the cache memory 1110 has less than 500 MB of available space, then the caching module 1118 looks at the two joined parent nodes; if the parent node joining L1 and L2 has a higher demand than the parent node joining L3 and L4 (and if the cache memory has at least 300 MB of available space) then the caching module 1118 stores the results of the second-order NLP processing for the topic/sentiment at the parent node of L1 and L2 in the cache memory 1110.

Figure 11:
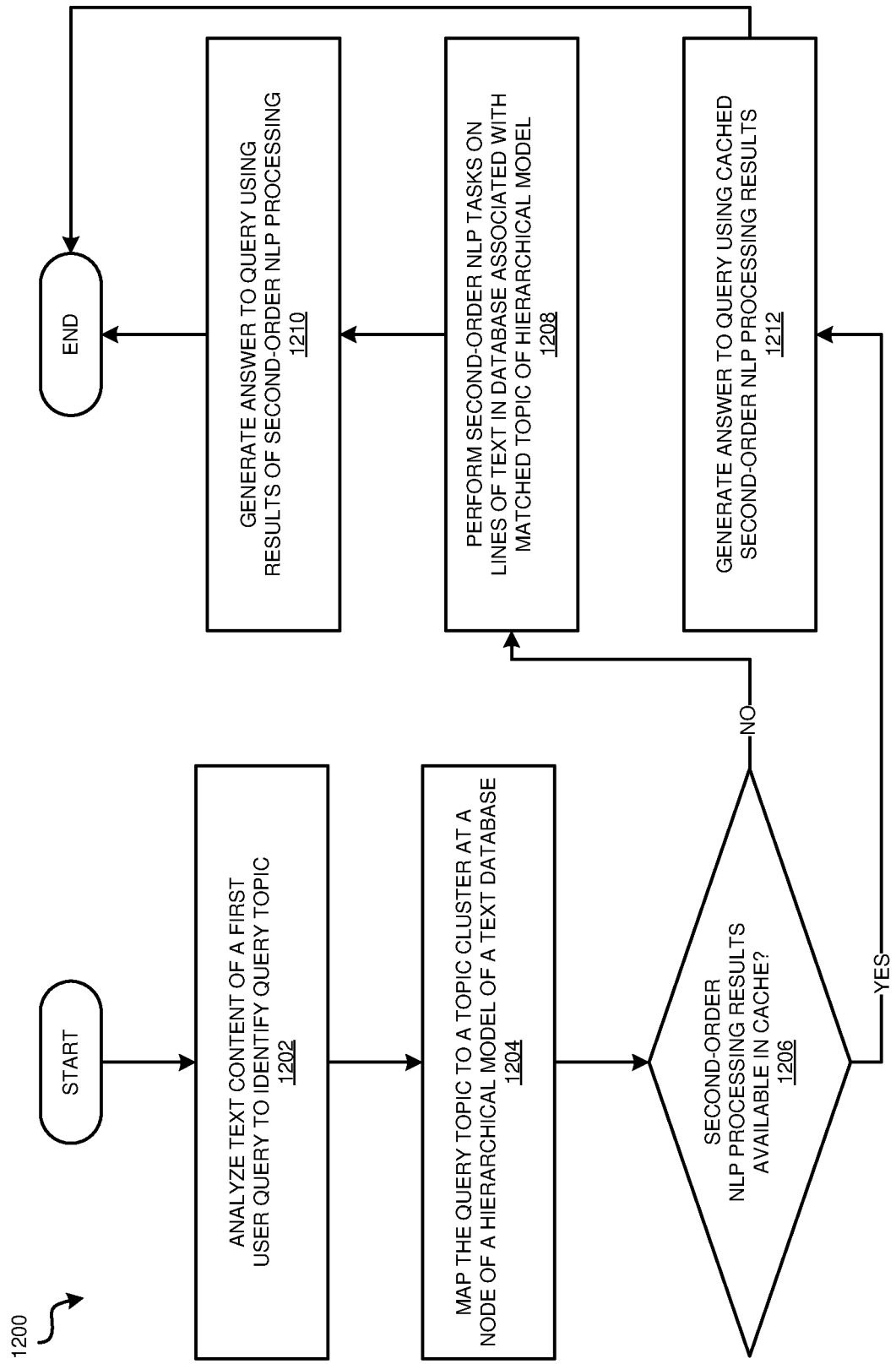
FIG. 11 depicts a flowchart of an example process for using cached NLP processing results to generate a response to a user query in accordance with an illustrative embodiment.

With reference to FIG. 11, this figure depicts a flowchart of an example process 1200 for using cached NLP processing results to generate a response to a user query in accordance with an illustrative embodiment. In a particular embodiment, the DBMS 402 carries out the process 1200.

In the illustrated embodiment, at block 1202, the process analyzes text content of a first user query to identify query topic. Next, at block 1204, the process maps the query topic to a topic cluster at a node of a hierarchical model of a text database. Next, at block 1206, the process determines if second-order NLP processing results are available in cache for the selected node. If so, then at block 1212 the process generates an answer to the query using the cached second-order NLP processing results. If the NLP processing results are not available in the cache, then at block 1208 the process performs second-order NLP tasks on lines of text in the database that are associated with the matched topic of hierarchical model. Then, at block 1210, the process generates an answer to the query using the results of the second-order NLP processing.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    establishing a database cache memory for selectively storing processed text data corresponding to a set of nodes of database data structure;
    generating a hierarchical topic model data structure by applying, by a neural network, a natural-language processing algorithm to a plurality of incoming text documents, the hierarchical topic model data structure comprising a text database having multiple nodes organized hierarchically;
    analyzing, by the neural network, text content of a first user query to identify via the natural language processing algorithm a first query topic defined by words of the text content;
    mapping the first query topic to a first topic cluster at a first node of the hierarchical topic model data structure;
    generating query demand data indicative of demand for the first topic cluster based on user queries of the text database;
    identifying the first topic cluster as a first topic-cache candidate based on the query demand data;
    identifying a first required amount of memory of the database cache memory required for storing text associated with the first topic cluster and comparing the first required amount of memory required for storing text associated with the first topic cluster to available database cache memory;
    caching, responsive to identifying the first topic cluster as the first topic-cache candidate and determining that the available database cache memory is greater than the first required amount of memory, the text associated with the first topic cluster in the database cache memory; the caching comprising retrieving the text associated with the first topic cluster from a persistent storage, and storing the retrieved text associated with the first topic cluster in the database cache memory;
    identifying a second topic cluster at a second node as a second topic-cache candidate;
    determining that a second required amount of memory required for storing text associated with the second topic cluster exceeds the available cache memory;
    replacing, as the second topic-cache candidate, the second topic cluster with a third topic cluster at a third node; and
    generating, by a neural network accessing the database cache memory storing processed text data associated with the first topic cluster and the third topic cluster, an answer to the first user query.

2. The computer-implemented method of claim 1, wherein the third topic cluster is associated with a subtopic of the second topic cluster.

3. The computer-implemented method of claim 1, wherein the third node is a child node of the second node.

4. The computer-implemented method of claim 1, further comprising:
    comparing a third required amount of memory required for storing text associated with the third topic cluster to the available cache memory; and
    storing, responsive to replacing the second topic cluster with the third topic cluster as the second topic-cache candidate and determining that the available cache memory is greater than the third required amount of memory, text associated with the third topic cluster in the database cache.

5. The computer-implemented method of claim 1, further comprising:
    replacing, as the first topic-cache candidate, the first topic cluster with a fourth topic cluster at a fourth node;
    determining that a fourth required amount of memory required for storing text associated with the fourth topic cluster exceeds the available cache memory; and
    replacing, as the first topic-cache candidate, the fourth topic cluster with the first topic cluster.

6. The computer-implemented method of claim 5, wherein the first topic cluster is associated with a subtopic of the fourth topic cluster.

7. The computer-implemented method of claim 5, wherein the first node is a child node of the fourth node.

8. The computer-implemented method of claim 1, wherein the hierarchical model of the text database comprises a hierarchical dendrogram.

9. The computer-implemented method of claim 8, further comprising:

associating nodes of the hierarchical dendrogram with respective topic clusters extracted from the text database.

10. The computer-implemented method of claim 9, further comprising:
associating nodes of the hierarchical dendrogram with respective sentiments extracted from the text database.

11. The computer-implemented method of claim 1, further comprising:
performing a second-order natural language processing task on text from the text database associated with the first topic cluster,
wherein the storing of the text associated with the first topic cluster in the database cache comprises storing results of the second-order natural language processing task in the database cache.

12. The computer-implemented method of claim 11, wherein the second-order natural language processing task is selected from the group consisting of dependency parsing, entity recognition, and part-of-speech (POS) detection.

13. A computer program product comprising one or more computer readable storage media, and program instructions collectively stored on the one or more computer readable storage media, the program instructions executable by a processor to cause the processor to perform operations comprising:
establishing a database cache memory for selectively storing processed text data corresponding to a set of nodes of database data structure;
generating a hierarchical topic model data structure by applying, by a neural network, a natural-language processing algorithm to a plurality of incoming text documents, the hierarchical topic model data structure comprising a text database having multiple nodes organized hierarchically;
analyzing, by the neural network, text content of a first user query to identify via the natural language processing algorithm a first query topic defined by words of the text content;
mapping the first query topic to a first topic cluster at a first node of the hierarchical topic model data structure;
generating query demand data indicative of demand for the first topic cluster based on user queries of the text database;
identifying the first topic cluster as a first topic-cache candidate based on the query demand data;
determining a first required amount of memory of the database cache memory required for storing text associated with the first topic cluster and comparing the first required amount of memory required for storing text associated with the first topic cluster to available database cache memory;
caching, responsive to identifying the first topic cluster as the first topic-cache candidate and determining that the available database cache memory is greater than the first required amount of memory, the text associated with the first topic cluster in the database cache memory; the caching comprising retrieving the text associated with the first topic cluster from a persistent storage, and storing the retrieved text associated with the first topic cluster in the database cache memory;
identifying a second topic cluster at a second node as a second topic-cache candidate;
determining that a second required amount of memory required for storing text associated with the second topic cluster exceeds the available cache memory;
replacing, as the second topic-cache candidate, the second topic cluster with a third topic cluster at a third node; and
generating, by a neural network accessing the database cache memory storing processed text data associated with the first topic cluster and the third topic cluster, an answer to the first user query.

14. The computer program product of claim 13, wherein the stored program instructions are stored in a computer readable storage device in a data processing system, and wherein the stored program instructions are transferred over a network from a remote data processing system.

15. The computer program product of claim 13, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

16. The computer program product of claim 13, wherein the third topic cluster is associated with a subtopic of the second topic cluster.

17. The computer program product of claim 13, wherein the third node is a child node of the second node.

18. A computer system comprising a processor and one or more computer readable storage media, and program instructions collectively stored on the one or more computer readable storage media, the program instructions executable by the processor to cause the processor to perform operations comprising:
establishing a database cache memory for selectively storing processed text data corresponding to a set of nodes of database data structure;
generating a hierarchical topic model data structure by applying, by a neural network, a natural-language processing algorithm to a plurality of incoming text documents, the hierarchical topic model data structure comprising a text database having multiple nodes organized hierarchically;
analyzing, by the neural network, text content of a first user query to identify via the natural language processing algorithm a first query topic defined by words of the text content;
mapping the first query topic to a first topic cluster at a first node of the hierarchical topic model data structure;
generating query demand data indicative of demand for the first topic cluster based on user queries of the text database;
identifying the first topic cluster as a first topic-cache candidate based on the query demand data;
determining a first required amount of memory of the database cache memory required for storing text associated with the first topic cluster and comparing the first required amount of memory required for storing text associated with the first topic cluster to available database cache memory;
caching, responsive to identifying the first topic cluster as the first topic-cache candidate and determining that the available database cache memory is greater than the first required amount of memory, the text associated with the first topic cluster in the database cache memory; the caching comprising retrieving the text associated with the first topic cluster from a persistent storage, and storing the retrieved text associated with the first topic cluster in the database cache memory;

identifying a second topic cluster at a second node as a second topic-cache candidate;

determining that a second required amount of memory required for storing text associated with the second topic cluster exceeds the available cache memory;

replacing, as the second topic-cache candidate, the second topic cluster with a third topic cluster at a third node; and generating, by a neural network accessing the database cache memory storing processed text data associated with the first topic cluster and the third topic cluster, an answer to the first user query.

* * * * *